(No Model.)
J. B. CLEMENTS.
NUT LOCK.
No. 315,001. Patented Apr. 7, 1885.
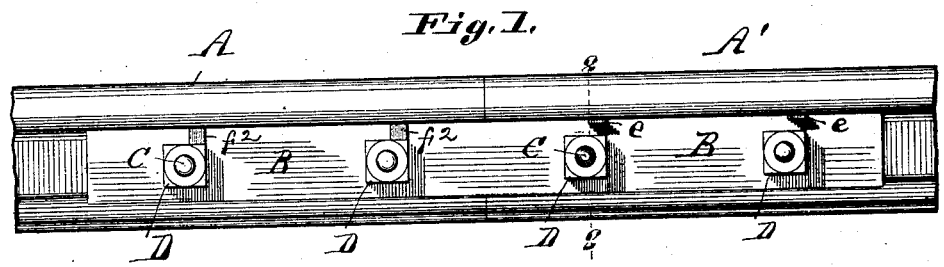
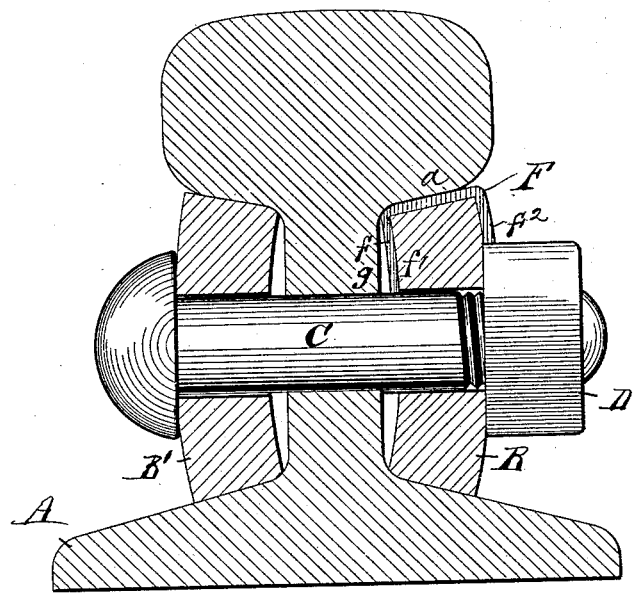
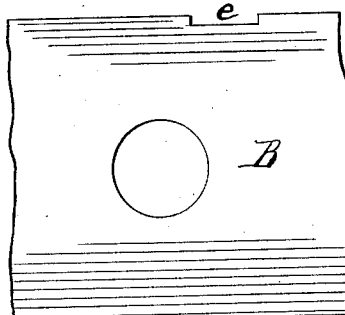
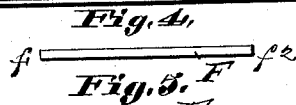
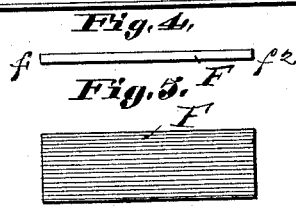
Attest
Charles Pickles
John W. Herthel
Inventor:
John B. Clements
per
Herthel & Co

UNITED STATES PATENT OFFICE.

JOHN B. CLEMENTS, OF ST. LOUIS, MISSOURI.

NUT-LOCK.

SPECIFICATION forming part of Letters Patent No. 315,001, dated April 7, 1885.

Application filed July 17, 1884. (No model.)

*To all whom it may concern:*

Be it known that I, JOHN B. CLEMENTS, a citizen of the United States, residing at St. Louis, in the State of Missouri, have invented a new and useful Improved Nut-Lock, of which the following is a specification.

My invention relates to an improved nut-lock specially applicable for the nuts on bolts used to secure fish-plates to railroad-rails, and in other analogous situations.

The objects which the invention has in view are to thoroughly bind the nut against the fish-bar or contiguous face to prevent the nut and bolt loosening from the jarring and friction to which they are subjected, and otherwise to give strength and efficiency to the connection of the rails or parts forming the joint. I achieve the said objects by the mechanism illustrated in the accompanying drawings, in which—

Figure 1 is a side elevation of a rail-joint embodying my invention. Fig. 2 is an enlarged cross-section of the same through the line 2 2, Fig. 1. Fig. 3 is a front face of the fish-plate, showing its groove; and Figs. 4 and 5 are respective edge and plan faces of the fastening-plate used.

Similar letters refer to similar parts throughout the several views.

A A' represent the rails.

B B' represent the fish bars, plates, or rail-splices. C is the screw-bolt. D is the nut. The respective fish-bars are placed alongside of the rail ends, the bolt is passed through said parts, and the nut is screwed on the bolt, all in manner usual.

The constructive features are as follows: First, in forming a groove, $e$, in the upper face of the fish-bar B for purposes of making room for the insertion of the fastening-plate between said upper face of the fish-bar and the contiguous shoulder-face (marked $a$) of the rail. (See Figs. 1, 2, 3.) This novel location for the fastening-plate enables me to secure the fastening-plate itself in place; secondly, the latter can then be made to form the means to hold the nut securely.

F represents the fastening-plate. It is simply a flat piece of metal bar, as shown in Figs. 4 and 5.

The operator inserts the fastening-plate F in the groove $e$, and in striking the outer end or driving the plate inward its rear arm, $f$, becomes bent between the vertical faces $g$ and $f'$, (the former being the rail, the latter the fish-bar,) so that said arm $f$ is secured in the space between said faces of the rail and fish-bar, as shown. This done, the forward portion of the fastening-plate is forced downward or bent in the direction of the nut to make the arm $f^2$ come close against the upper corner of the nut, as shown in Fig. 1, and thereby lock the nut in place. It is the bearing of the lower end of the arm $f^2$ of plate F that prevents the nut from screwing in an opposite direction; and, since the plate F itself is prevented from moving, the nut is kept securely locked. This nut-lock is very simple. The joint is rendered durable. It effectually locks the nut. It is applicable to any pattern of fish-plate, and has the advantages of being cheap, and time and labor saving.

What I claim is—

1. In a nut-locking device, the combination of the rail A, fish-bar B, bolt C, and nut D, the fastening-plate F, bearing against the corner of the nut, said plate extending over the upper face of said fish-bar and secured between the vertical faces of the rail and fish-bar, substantially as shown and described.

2. The combination of the rail A, fish-bar B, having the groove $e$, the bolt C, the nut D, the fastening-plate F, seated in said groove and having its rear arm, $f$, bent between the faces of the rail and fish-bar, and its front arm, $f^2$, bent down to secure the nut, substantially as and for the purposes set forth.

In testimony of said invention I have hereunto set my hand.

JOHN B. CLEMENTS.

Witnesses:
    WILLIAM W. HERTHEL,
    WILLIAM C. MORRIS.